(12) United States Patent
Dell'Orto

(10) Patent No.: US 8,274,407 B2
(45) Date of Patent: Sep. 25, 2012

(54) DEVICE FOR SELECTION OF SYMBOLS, SUCH AS CHARACTERS, ICONS AND/OR MULTIPLE CHOICES

(75) Inventor: Pierluigi Dell'Orto, Besana in Brianza (IT)

(73) Assignee: Matrix Projects LLC, Tappan, NY (US)

( * ) Notice: Subject to any disclaimer, the term of this patent is extended or adjusted under 35 U.S.C. 154(b) by 1263 days.

(21) Appl. No.: 11/914,333

(22) PCT Filed: May 9, 2006

(86) PCT No.: PCT/IB2006/001197
§ 371 (c)(1),
(2), (4) Date: Feb. 11, 2008

(87) PCT Pub. No.: WO2006/120543
PCT Pub. Date: Nov. 16, 2006

(65) Prior Publication Data
US 2008/0211695 A1    Sep. 4, 2008

(30) Foreign Application Priority Data
May 12, 2005  (IT) .............................. MI2005A0855

(51) Int. Cl.
*H03K 17/94* (2006.01)
*G06F 1/16* (2006.01)
*H05K 5/00* (2006.01)
*H05K 7/00* (2006.01)
*H04N 5/232* (2006.01)

(52) U.S. Cl. .................. 341/20; 361/679.18; 361/679.1; 348/211.7

(58) Field of Classification Search .................... 345/161
See application file for complete search history.

(56) References Cited

U.S. PATENT DOCUMENTS

| 5,831,554 A  * | 11/1998 | Hedayat et al. ................. 341/20 |
| 6,448,670 B1 * | 9/2002  | Onodera et al. ............. 307/10.1 |
| 2001/0048425 A1 | 12/2001 | Partridge |
| 2002/0145587 A1 | 10/2002 | Watanabe |
| 2007/0273648 A1* | 11/2007 | Fussinger ..................... 345/161 |

FOREIGN PATENT DOCUMENTS

| BE | 1 015 349 | | 2/2005 | |
| EP | 1168147 | * | 1/2002 | .................... 345/161 |
| WO | 2004/072837 A1 | | 8/2004 | |
| WO | WO2004072837 | * | 8/2004 | |

OTHER PUBLICATIONS

International Search Report of PCT/IB2006/001197 filed May 9, 2006, date of mailing Jan. 17, 2007.

* cited by examiner

*Primary Examiner* — Albert Wong
*Assistant Examiner* — Jerold Murphy
(74) *Attorney, Agent, or Firm* — Young & Thompson

(57) ABSTRACT

A compact electric device for coding and selecting characters, symbols and/or multiple choices, includes a matrix carrying a plurality of contact or proximity sensors (1,2,3,4,5,5, 7,8), an activation member (10) of sensors and a single selection key (22). This key is operated by the user for bringing in turn the activation member at least partially in coincidence with at least a first and a second of the sensors, for transmitting a selectively different coded signal for each respective different sensor. The matrix comprises a first group of sensors (1,2,3), having function of selection of respective matrix fields, and a second group of sensors (4,5,6,7,8), having function of selection of characters associated to each matrix field. The sensors are distributed on the matrix according to modular zones, having a central zone (0) and radial sector zones (A, B, C, D).

20 Claims, 12 Drawing Sheets

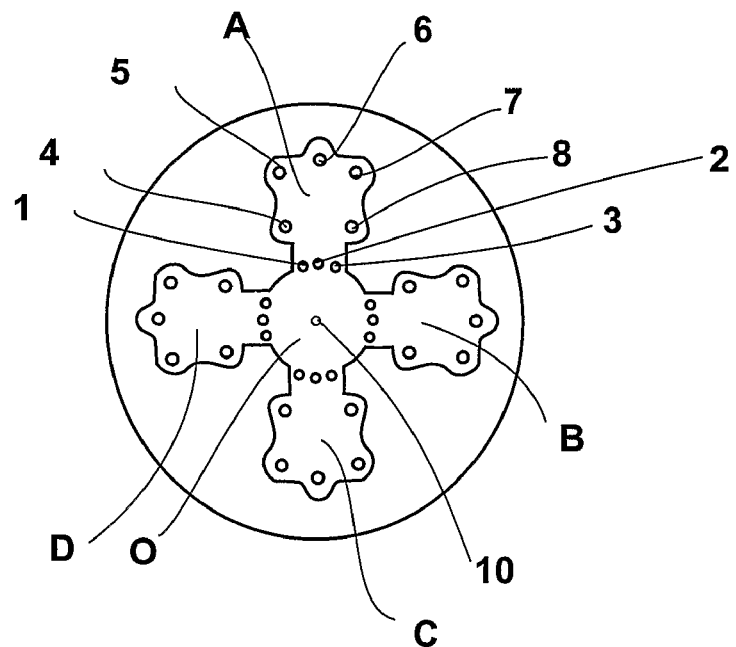
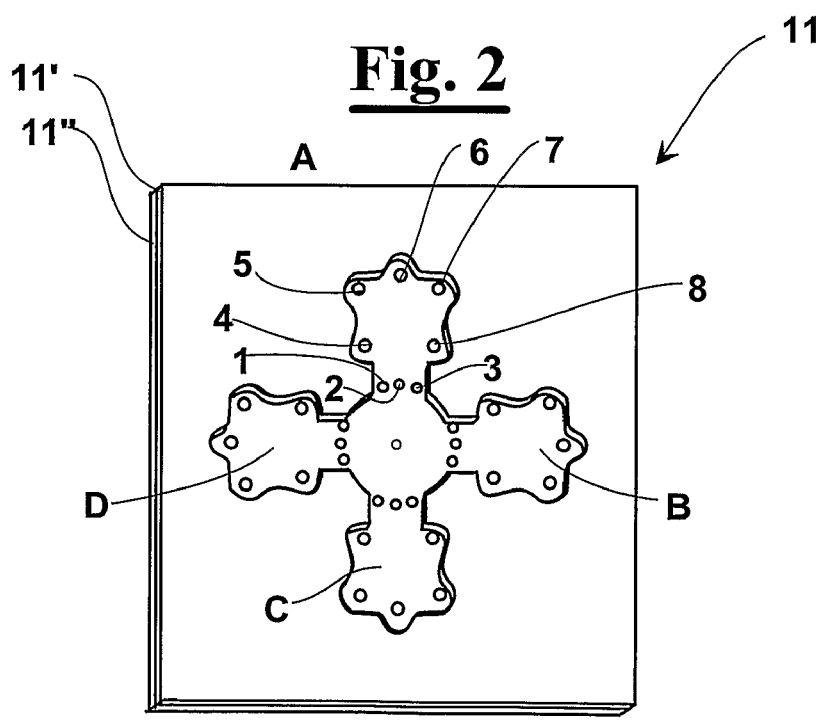

DEVICE FOR SELECTION OF SYMBOLS, SUCH AS CHARACTERS, ICONS AND/OR MULTIPLE CHOICES

FIELD OF THE INVENTION

The present invention relates to a device for coding and selecting characters, icons and/or multiple choices, based on the use of a single input element (single key), which can be operated according to different trajectories controlled directly by a user. In the following description with the term "symbol" a character, an icon, a command for example of the multiple choice type, are generically defined.

BACKGROUND OF THE INVENTION

The need is felt in many devices, which in use provide an electronic controller, to introduce data through an input element.

Normally, an alphanumeric keyboard is provided; special pivoting keys also exist, which allow a limited number of multiple choices, typically four.

It is also well known the need of miniaturization of some electronic devices, such as mobile phones and "palm top" computers, as well as keyboards for dashboards, for example on a steering wheel.

Such miniaturization is often limited by the need to provide a keyboard whose size allows to operate easily the relative keys, owing to the typical size of the fingers of the hand. In these cases, keyboards are provided with a limited number of keys, giving to each key more functions, determined according to the push sequence of the keys same. Alternatively, sometimes, if possible, special actuating sticks are provided, which allow the discrimination of the characters even with a reduced size of the keyboard.

This last possibility, however, cannot be generalized, because the use of both hands is required, one for supporting the device and the other for operating the stick, and also because it is not advantageous in certain conditions for use in the outer environment.

In the following description reference is made to the fact that the invention can be applied for example as single key for operating cellular telephones, steering wheels for cars, etc.; such a reference should, however, be considered purely exemplifying and not limitative, since a skilled person is perfectly capable to design different uses all the times that it is necessary, or desirable, to provide an actuating means with a "single key of drive" for generating signals of different type, both for an end user and for any use in industrial fields.

It should be considered that an alphanumerical keyboard for computer has at least about 90 keys by which, if differently combined, it is possible to type at least about 200 alphanumerical characters or other symbols. Instead, in case of a mobile phone, where 15 keys are normally provided on average, for transmitting a much higher number of alphanumerical symbols, to the keys a "multiple" task is given. In other words, each key provides different signals depending on whether they are pressed only once or more times in quick succession. These keyboards are now very common, and their use is so common that mobile phone owners, in particular the youngest, do not have difficulty to type quickly even long messages (SMS).

Since the technology points toward miniaturization, the problem arises of a further reduction of size of an input system, replacing a keyboard, capable of generating a plurality of different signals in an easy and intuitive way.

Many types exist of devices adapted to solve, even if partially, the problems above described. For example, WO2004072837 describes an input device with a single key that can be operated in different directions within the range of action of a user's finger for the input of many controls. A plurality of sensor means is provided, to sense the approaching or the contact of the input key, and for generating a relative signal that is received by a control unit that finds out which sensor has been involved by the key and associates a corresponding command, which can be for example a letter of the alphabet, a number, etc. In this way the size of the input device can be remarkably reduced, allowing a miniaturization of the electronic apparatus that uses it. This device, however, provides a plurality of grooves arranged for example in the number of 12 each 360°. In each groove more sensors can be arranged. Then, the user chooses one of the twelve directions and pushes the key in that direction, passing all the sensors up to reaching that predetermined corresponding to the chosen character or command. This system can introduce input errors, since the user must stop at the sensor corresponding to the chosen command, and cannot go beyond it reaching the successive sensor, otherwise the chosen command is different.

SUMMARY OF THE INVENTION

The present invention is oriented to solve this problem in a reliable and industrially cost effective way.

The basic idea of the present invention is that of selecting symbols, such as characters, icons and/or multiple choices, providing a matrix having a plurality of sensors split into a first group of sensors, having function of choice, and at least a second group of sensors, associated each to a limited number of such symbols. Such sensors can be activated bringing an activation member at least partially in coincidence with one of said sensors, determining a corresponding selection signal. This way, bringing the activation member in turn on a first sensor belonging to the first group and then a second sensor belonging to the second group, it is possible to identify each sensor of the first and second group as they are selected, choosing univocally one among the limited number of symbols associated to the sensor of the second group, in a way responsive to which the sensor of the first group had been selected immediately before by said activation member.

This gives a function of "gate" to the sensors of the first group, allowing a unique choice of a symbol associated to a sensor of the second group. Furthermore, the possible combinations can be multiplied, covering with a single input device a high number of different symbols. The selection of a symbol is obtained, this way, with a single movement of a finger following a determined path in a minimum radius of action causing the activation member or slider to reach different sensors with a single movement, which is sudden, quick, continuous and harmonic without detaching the finger from the slider. The activation member stops then against the edge containing the sensors, assisting the movement and the choice of a desired path.

This way a device is obtained having a very intuitive use and capable, with the practice, to be operated even without looking at the motion that it follows by the action of a finger.

BRIEF DESCRIPTION OF THE DRAWINGS

Further characteristic and advantages of the invention, as well as its operation and its logic actuation, will be better comprised through the detailed description of some exemplary embodiments, given as an example, shown in the attached drawings, wherein:

FIG. 1 is a top plan view of a first exemplary embodiment of a device according to the invention, in particular with a matrix configuration having four actuating zones, which can be used in combination with single-key actuating means;

FIG. 2 shows an exemplary embodiment of the matrix configured device of FIG. 1, arranged as a plane, having a thickness;

DESCRIPTION OF A PREFERRED EXEMPLARY EMBODIMENT

As shown in FIG. 1 or 2, a matrix configuration according to the invention can have, for example, a cloverleaf shape, with a central rest zone O and four working zones A, B, C, D, arranged radially, in a star rays arrangement, with respect to said central zone O. At the centre of this zone O an activation member is located, indicated as 10. The working zones A, B, C, D, are alike and for each zone (only the sensors of the zone A are numbered advantageously) three sensors 1, 2 and 3 are arranged in the passageway towards each radial zone, and belonging to a first group of sensors. In each radial zone other five sensors are provided, distributed at the boundary, as better described hereinafter, and defined by the reference numbers 4, 5, 6, 7 and 8, which belong to a second group of sensors.

Here and hereinafter a generic "activation member" is referred to, as well as "sensor", being it clear that with the first term the device indicated as 10 is defined, which is a movable element associated to a key or push button, and with the second term an element indicated as 1 up to 8 is defined, which are fixed elements, adapted to measure the presence or the contact of the activation member. These terms "activation member" and respectively "sensor" must not therefore be interpreted narrowly, or in a limitative may, but only as an exemplary way to define two opposite elements that, when they are in coincidence or in close proximity with each other, they are capable to emit a coded signal, specific for each of said sensors and/or of the matrix field that is respectively associated to them.

Figure 8:
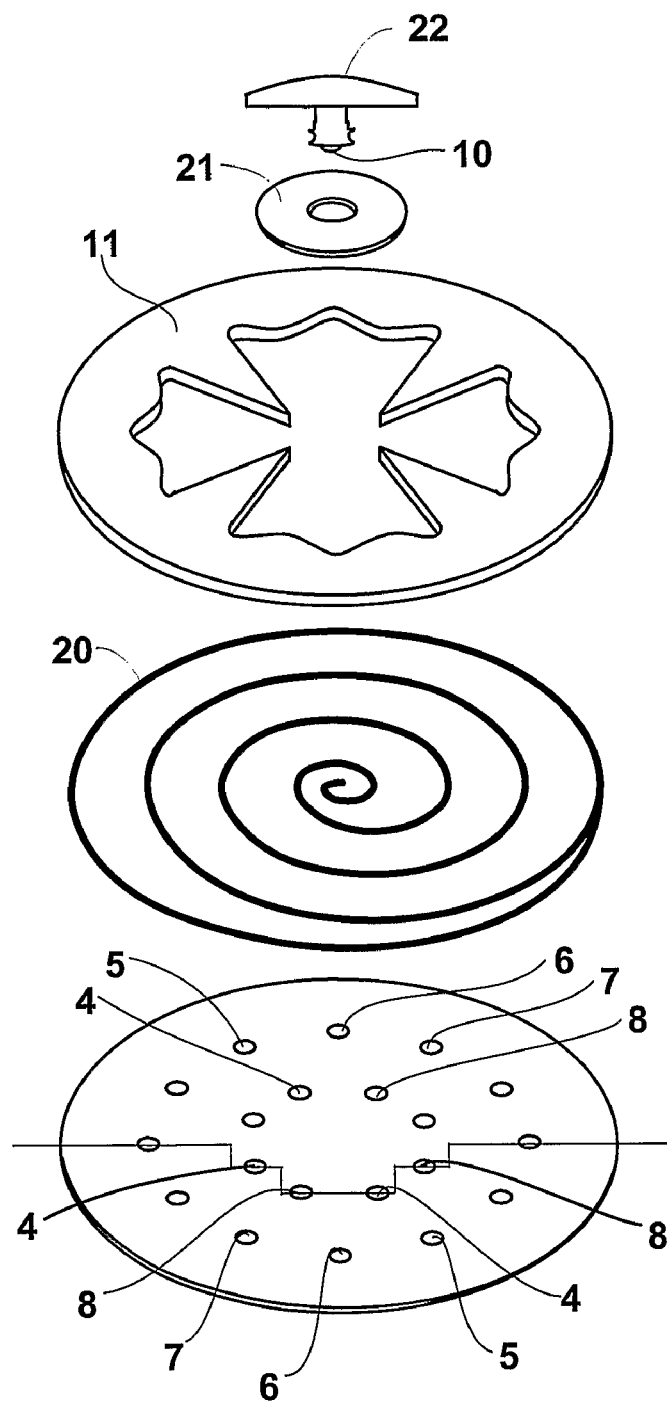
FIG. 8 shows an exploded perspective view of a possible structure of the first exemplary embodiment of the device according to the invention.
Figure 9:
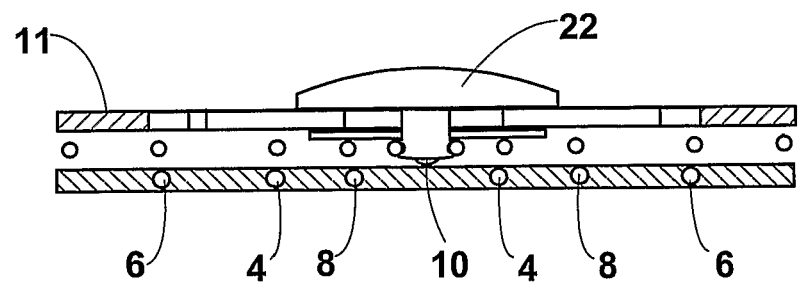
FIGS. 9 to 11 show a cross sectional view of three possible variations of the first exemplary embodiment of the device according to the invention.
Figure 10:
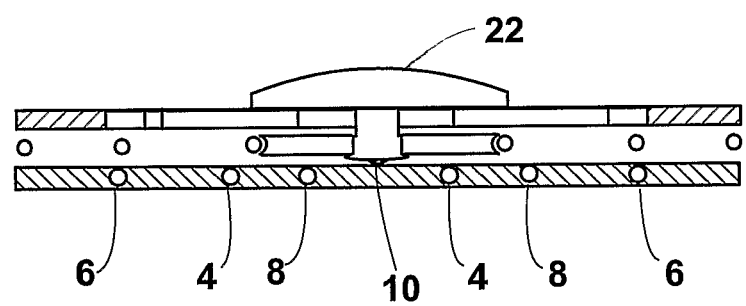
Figure 11:
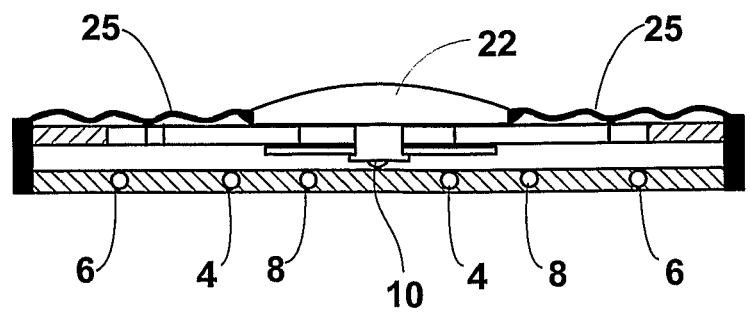

The activation member 10, as said, is associated to a selection key, here not shown but visible for example in FIG. 8 and indicated with 22, which is located at the central zone O and is manoeuvrable by the operator. This element, here and hereinafter called simply as "selection key", may have a desired configuration adapted to move the activation member 10 to it associated with respect to the fixed sensors from 1 to 8; such a configuration can be a push button, an actuating stick of the type used for controlling a "palm top", or a pin or button or lever of manoeuvre hinged at the centre, preferably associated to resilient means that, when the lever is operated for displacing the activation member 10 towards the radial zones, and then released, tends to bring it back always towards the centre.

When the selection key is operated towards one of the radial zones, firstly it passes at one of the sensors 1, 2 and 3 of the respective zone and, thus activating one of them, which for example can be a contact or a proximity sensor, a microswitch, a Hall effect sensor, a magnetoresistive sensor or a active matrix sensor. Depending on whether this activation affects sensor 1, 2 or 3, a first, or a second, or a third matrix field associated to said zone is correspondingly selected; these matrix fields can be considered "virtual" because each field is determined by the same sensors from 4 to 8 of a specific zone, but considered in a different way by the control unit, responsive to which sensors from 1 to 3 had been pre-selected.

Actually, when the selection key continues its movement up to one of sensors 4, 5, 6, 7, 8, it activates the selection of one of the characters/symbols associated to the selected sensor and respectively to the first, to the second or to the third matrix field.

Figure 15:
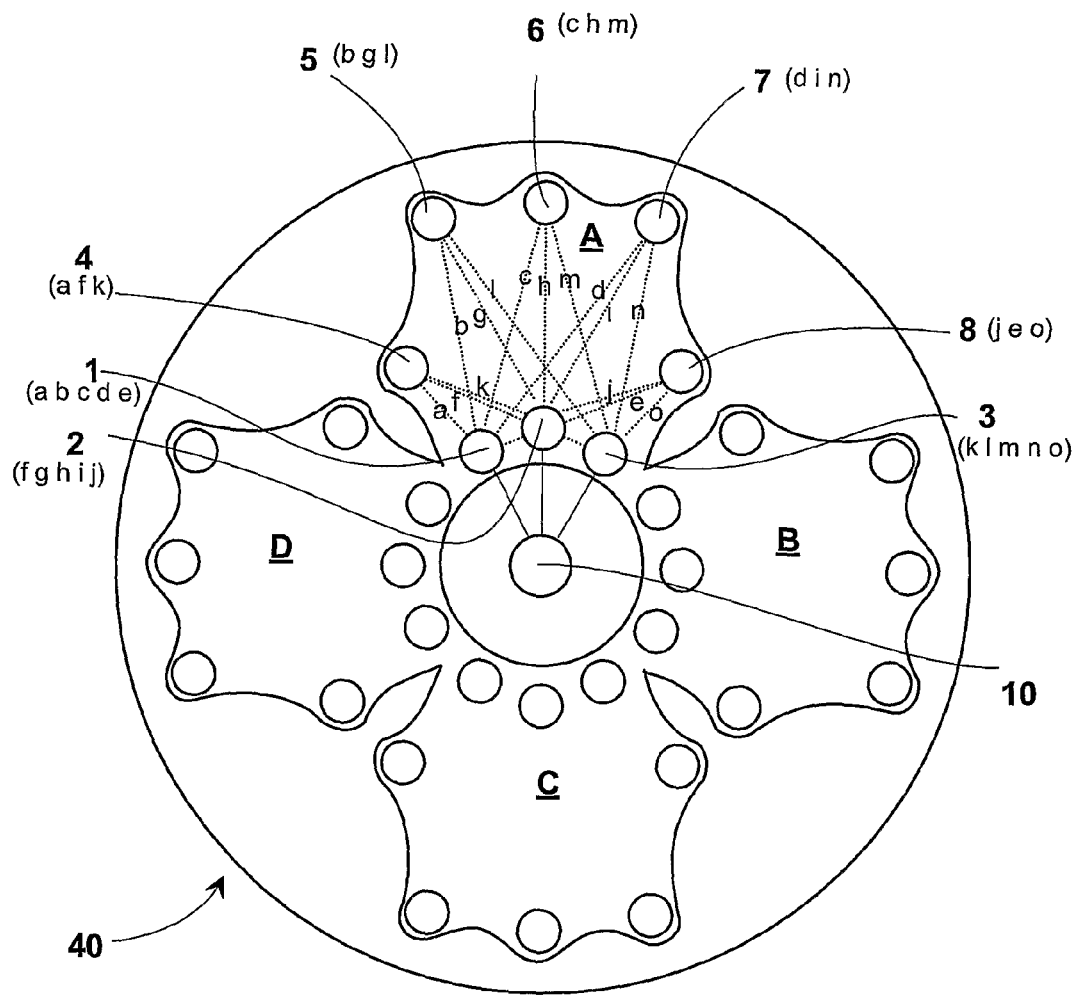
FIGS. 15 and 16 show two diagrams, relative respectively to the exemplary embodiments of FIG. 1 and of FIG. 8, of the possible selection path of the characters, a combination of sensors of the first group with those of the second group, each path corresponding a different character.
Figure 16:
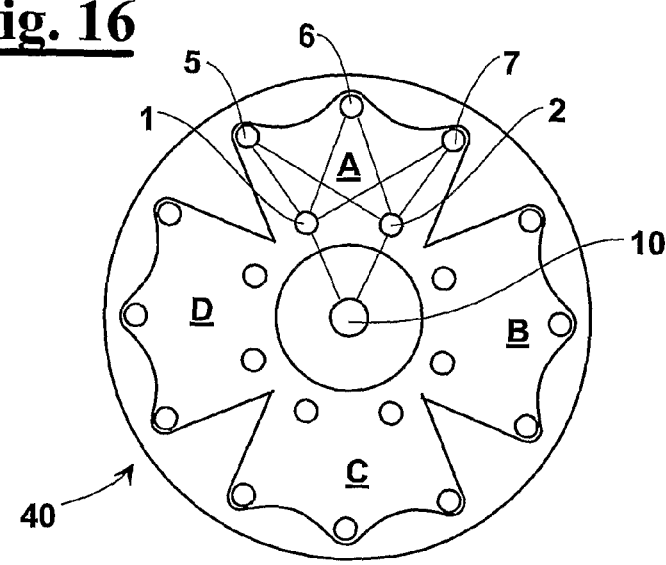

Possible combinations of paths, respectively for the configurations of FIG. 1 and of FIG. 8, are shown in FIGS. 15 and 16.

For a better understanding of this arrangement of the present invention, the following example is given, with reference to FIG. 1 and to FIG. 15:

In this example three matrix fields are associated to zone A, indicated as fields 1, 2 and respectively 3;

field 1 is associated to sensor 1, field 2 is associated to sensor 2 and field 3 is associated to sensor 3 of the first group of sensors;

to matrix field 1 five characters are associated, for example corresponding to the letters "a", "b", "c", "d", "e", and these characters are associated respectively to sensors 4, 5, 6, 7, 8 of the second group of sensors;

furthermore, to field 2 five characters are also associated, different from the characters of field 1, for example corresponding to the letters "f", "g", "h", "i", "j", in turn associated always respectively to sensors 4, 5, 6, 7, 8;

finally to field 3 further five characters are associated, for example corresponding to letters "k", "1", "m", "n", "o", in turn associated always respectively to sensors 4, 5, 6, 7, 8.

When the selection key moves for example towards zone A, it is intentionally brought to slide in the vicinity of one of sensors 1, 2 or 3 of the first group, as desired, for example sensor 2, thus activating matrix field 2. Moving on within zone A, the selection key is then brought at one of the five sensors of the second group, which are arranged according to this zone A; for example the sensor chosen is sensor 5, activating as defined above the character corresponding to letter "g"; this character corresponds in fact to sensor 5 of second matrix field 2.

In addition, explaining two additional exemplary arrangements, if the selection key is maintained for a short time at the selected sensor, or if it is pressed in this position, at the letter "g", lower case, then the letter "G" upper case is selected. Other equivalent solutions are obvious to the skilled person.

It is clear that to each zone A, B, C or D three matrix fields correspond and to each of these fields five characters correspond, therefore fifteen characters for each zone, i.e. sixty characters or different symbols in the combination of the four zones. On the other hand, it is apparent that this is a simple example and that it is very easy for a skilled person to design a matrix that, instead of having four cloverleaf zones and five sensors for each zone, it has a different number of zones and a different number of sensors for each zone.

Figure 17:
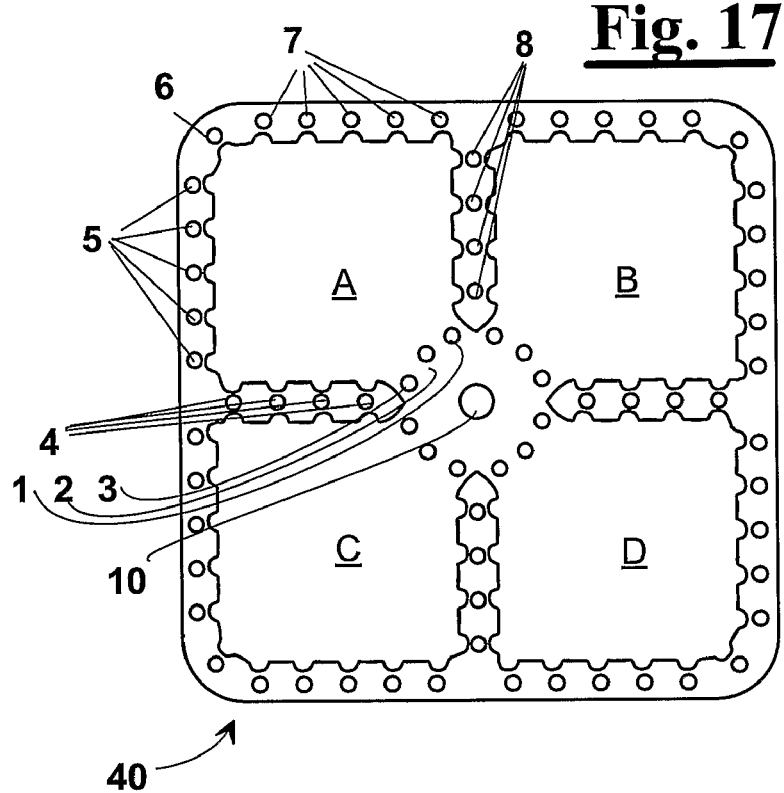
FIGS. 17 and 18 show two exemplary embodiments of the device, with a high number of combinations of possible paths and then of obtainable symbols.
Figure 18:
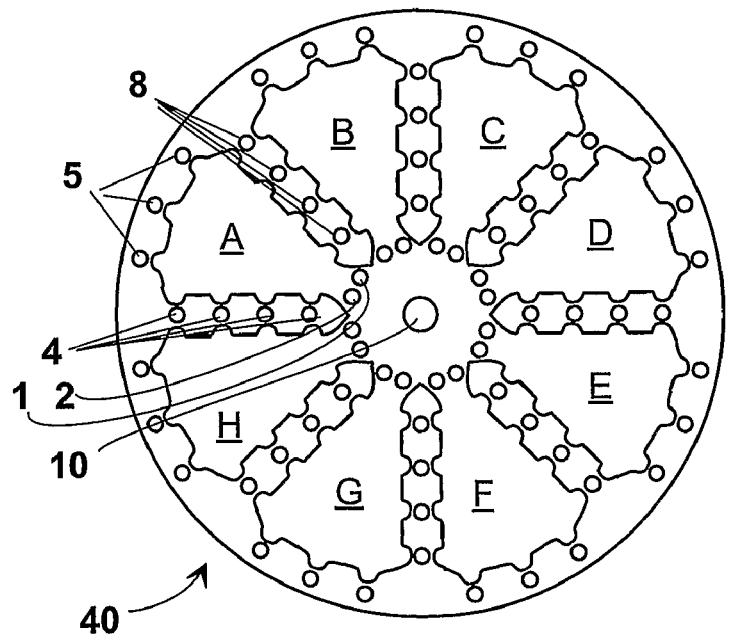
Figure 19:
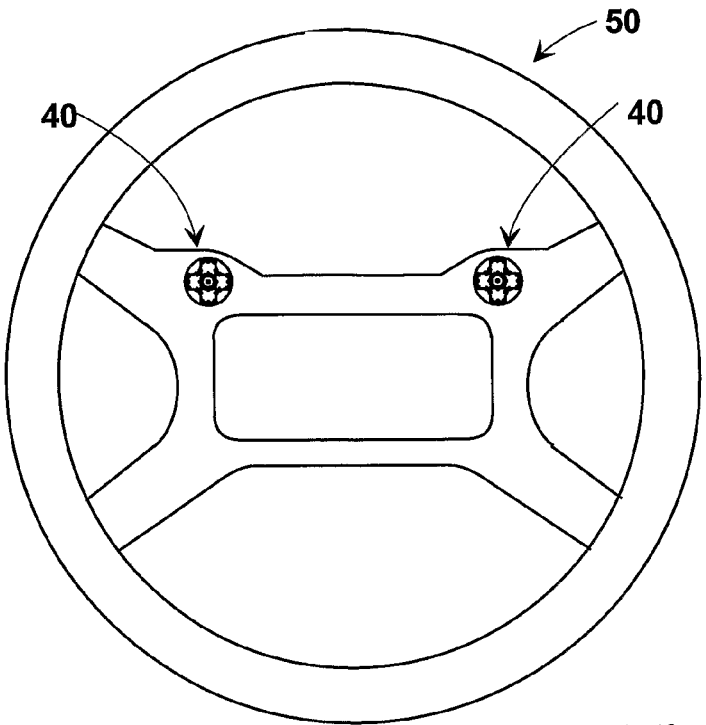
FIG. 19 shows a device according to the invention mounted on the steering wheel of a vehicle.

An example of this arrangement is given in FIGS. 16, 17 and 18. In the first case, FIG. 16, for each zone A-D two sensors of the first group are provided, indicated as 1 and 2 for zone A, and three sensors of the second group, indicated as 3, 4, 5 for zone A. This device, with twenty sensors, allows to select up to 24 symbols or characters for each mode of operation of the selection key 10.

In the latter case, FIG. 17, the four zones A-D are four respective quadrants, having common sides. This way, for each zone A-D three sensors of the first group, indicated as 1-3 for zone A, and nineteen sensors of the second group, indicated as 4-8 for zone A are provided. This device, by means of 68 sensors, allows to select up to 228 symbols or characters for each mode of operation of the selection key 10. This solution with adjacent quadrants is very effective since it is possible to put common sensors at the border between two adjacent zones, i.e. the common sides, as in the case of sensors 4 and 8. In fact, even if being shared by two adjacent zones, the sensors 4 and 8 are discriminated according to the path followed for the respective zone, recognizing the respective sensor of the first group, 1 or 2 in case of zone A.

In a way similar to FIG. 17, in the third case of FIG. 18, there is a division into fields with common sides. In particular, there are seventy two sensors split into eight zones A-H, for each zone two sensors of the first group are provided, indicated as 1-2 for zone A, and nine sensors of the second group, indicated as 4, 5 and 8 for zone A. This device, allows selecting up to 176 symbols or characters for each mode of operation of the selection key.

The sensors 4-8 for all the zones and for various exemplary embodiments shown up to here, can be made within the edges of the zone or at the edges same. The same occurs for the gate sensors indicated as 1 and 3, excluded sensor 2 that is located at the centre.

To this purpose, the transmission of a coded signal from one of the sensors from 1 to 8 takes place not only when the activation member 10 moves in perfect coincidence with one of them; it is enough that the activation member 10 moves close to one of them to select it, at a distance nearer than to the others. Actually, the motion of the activation member 10 near a desired sensor 1 to 8 provides an electric signal, for example by Hall effect, which is proportional to the overlap of the active surfaces of such sensors. It is not necessary, as already mentioned, that the passage on sensor occurs with high precision, but only the strongest signal, i.e. in proximity to a sensor, higher with respect to the other sensors near it. This aspect is diagrammatically shown in FIGS. 6A and 6B with reference, for example, to the three sensors 1, 2, 3 that are located, with reference for example to FIG. 1, 2 or 15, on the passageway of activation member 10 when it is moved from the central position towards one of zones A, B, C or D, for example zone A.

Figure 6A:
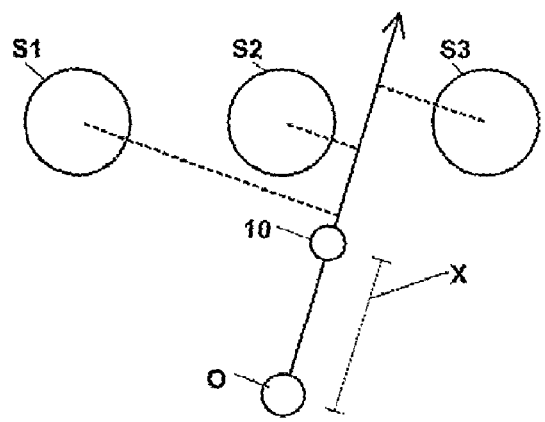
FIGS. 6A and 6B show respectively a situation of three sensors placed adjacent to one another and a diagram that shows the amplitude of the detectable signals, which is different responsive to the distance of the selection key from each sensor.
Figure 6B:
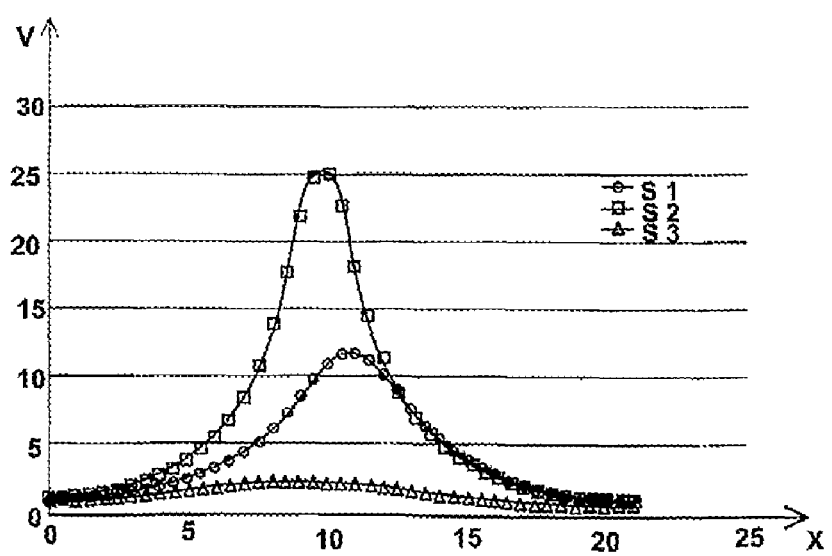

Always with reference to FIG. 6A, when activation member 10 moves approximately towards sensor 2, on it a signal "S2" is generated that, as shown in FIG. 6B, has an amplitude higher than signals "S1" and "S3" obtained for sensors 1 and respectively 3. The central electronic control unit is then capable to discriminate among these different signal amplitudes and therefore to consider sensor 2 activated, i.e. that for which the signal has higher amplitude. The same occurs, for example, when a user moves activation member 10 in zone A, towards one of the sensors 4, 5, 6, 7, 8 of the second group (for example always with reference to FIG. 1, 2 or 15), arranged approximately along the border of zone A.

The action of the finger of the hand on the selection key, for reaching the different sensors, in particular, sensors 4, 5, 6, 7, 8 located on the contour of each radial zones A, B, C, etc., is carried out in a way assisted by stopping the selection key against the edge of each zone; concerning the sensors of the first group 1, 2, 3 located on the passageway between the central zone or and the radial zones, the movement through them is more intuitive, for example sliding on the edge at the right or the left of the figure, concerning respectively sensors 1 and 3, or running in the centre on sensor 2, when a user is sufficiently trained. Even in this case, however, a reference for guiding the activation member for selecting the sensors of the first group can be provided, such as grooves or ridges.

To assist in any case to precisely reach all these sensors the following additional arrangements are preferably required:

firstly, the drive logic can be made preferably in order to have instantly on the display the character or symbol corresponding to the sensor that each time is obtained by the selection key; thus, the user can test immediately if this character or symbol is correct, then on a display a diagram can be provided for easily reading the positions that can be reached by the selection key and the corresponding characters obtainable;

finally, as already said, if the sensors are proximity sensors, the selection key passing between two sensors is in any case detected, and the choice of the character is made by a control routine that chooses the stronger signal on the nearest sensor; the control routine can discriminate the signal corresponding to the nearest sensor according to the features of the detected signal, except from errors or failure of the system, but also in these cases the user has always the possibility to cancel the possible wrong character and to select a correct signal.

The choice of the characters is immediate, for having a quick selection. In case of error, once the selected character has been shown on the display, the user can cancel it maintaining the selection key on the same sensor for a longer time, at the end of which the control routine carries out its cancellation and the user can then select a correct character.

Alternatively, the logic of drive cannot select instantly a character, but it has to wait a confirmation from the user; such a confirmation can be given, for example, with a short pressure on the selection key or, in an easier way, on a short stop of the selection key at the chosen sensor.

Figure 7:
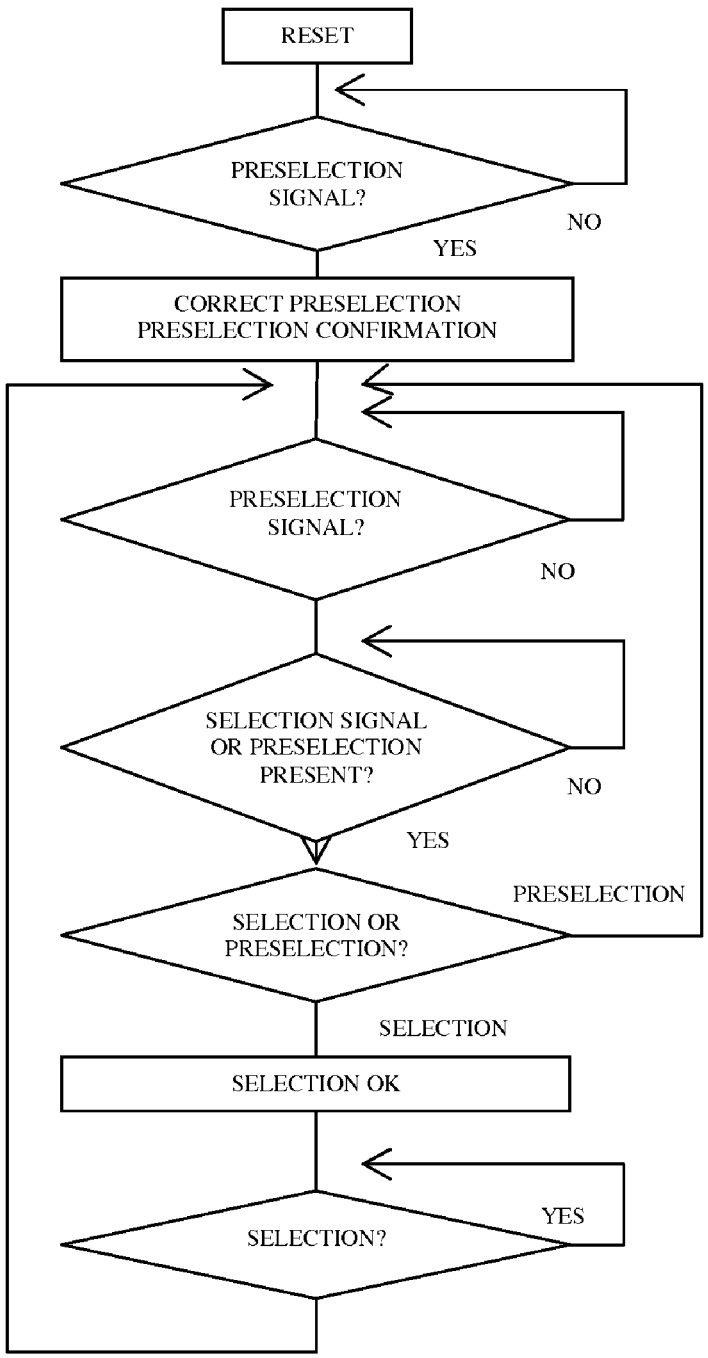
FIG. 7 represents a generic flow-sheet of a control software in conditions of operation.

The control routine proceeds for example according to the flow-sheet of FIG. 7, but it is clear that this diagram is purely exemplary and a skilled person can provide different equivalent softwares. In FIG. 7 with "preselection" the activation has been indicated of a sensor of the first group, and with "selection" the activation of a sensor of the second group has been indicated.

In this control routine a deleting mode can be provided, for example, as already said, with permanence of the selection key on a respective sensor for a longer time letting the operator to choose then another symbol or character; it will move then to another position of the same zone, if the symbol is along the same path, or it will follow a different path in the same zone, or it will enter different zones according to the above described procedure. Actually, the control routine is such that when exiting from a zone the coding operations are not affected, unless cancelling the previous pre-selections.

It is also possible that, alternatively, stopping on a whichever sensor of the first group, a single and progressive cancellation is activated. Alternatively, the function of cancellation can be achieved by following a succession of a determined sensor of the first group and of one of the second group.

Figure 20:
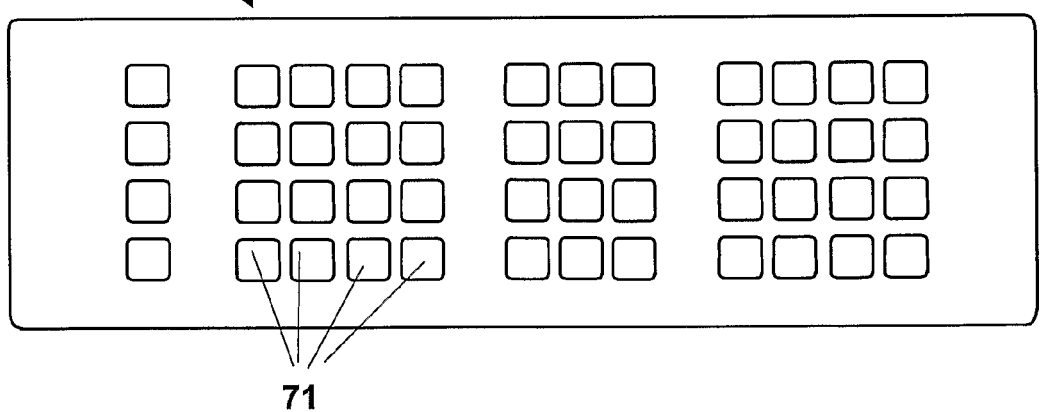
FIG. 20 shows a remote control of prior art.
Figure 21:
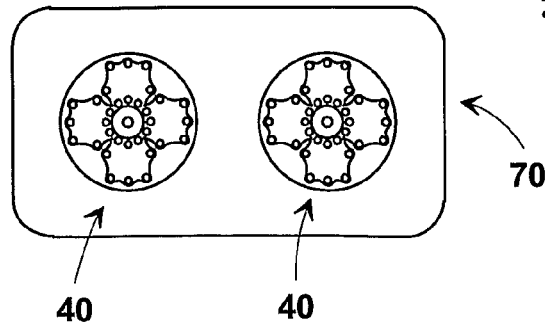
FIG. 21 shows a remote control of reduced size obtainable using the device according to the invention, even if with the same number of combinations of the keys of the device of FIG. 20.
Figure 22:
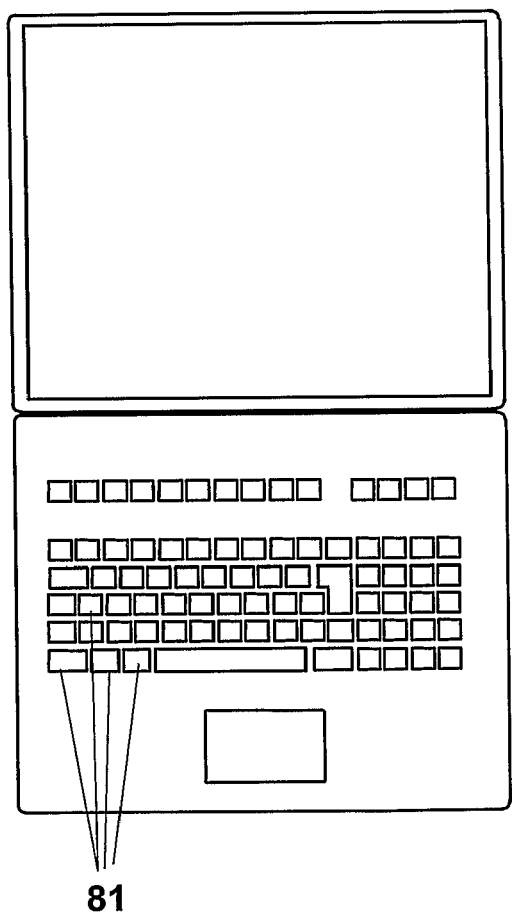
FIG. 22 shows a portable computer of prior art.
Figure 23:
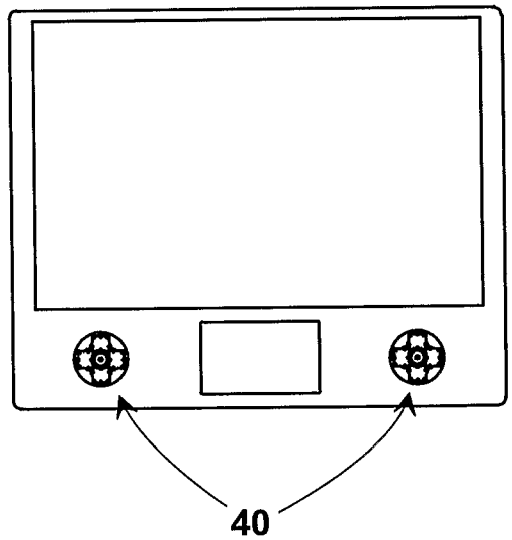
FIG. 23 shows a portable computer of reduced size obtainable using the device according to the invention, even if with the same number of combinations of the keys of the portable computer of FIG. 22.
Figure 24:
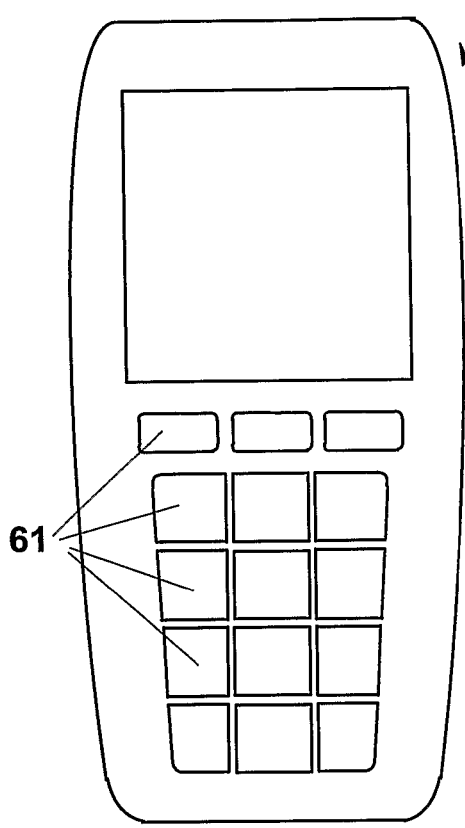
FIG. 24 shows a mobile phone of prior art.
Figure 25:
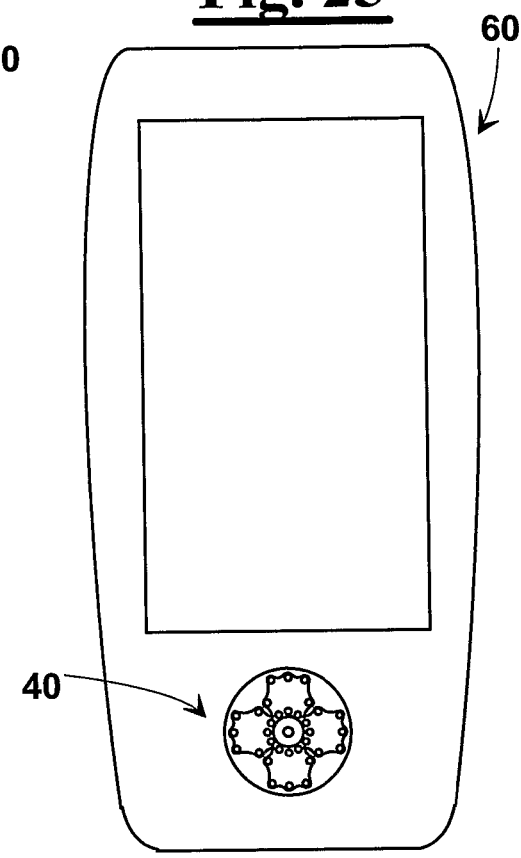
FIGS. 25 and 26 show a mobile phone respectively with display larger or smaller, obtainable using the device according to the invention, even if with the same number of combinations of the keys of the mobile phone of FIG. 24.
Figure 26:
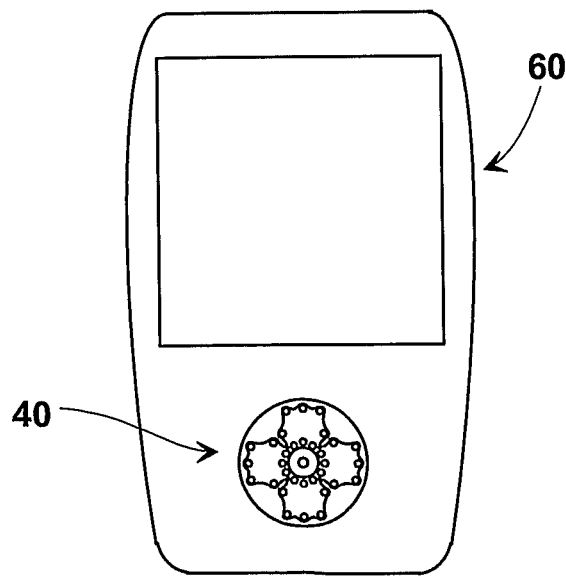

It is in any case clear the essential difference of the arrangement according to the invention with respect to the prior art. In the latter, for example in a remote control (FIG. 20), in portable computers (FIG. 22) or in mobile phones (FIG. 24), the choice of different characters is obtained through a more or less high number of selection keys. In particular, in case of the mobile phones, on at least ten keys, corresponding to the numbers from 0 to 9, and furthermore, pressing again the keys to obtain characters arranged in groups of three or four. According to the present invention, instead, operation of a single selection key is required, in single or double configuration according to various applications and structures, i.e. the key associated to the central sensor 10, as shown in FIG. 21 in remote controls, in FIG. 23 in portable computers, and in FIGS. 25 and 26 for mobile phones.

In addition to what described above with reference to FIG. 1, that, in the arrangement as represented, allows determining the choice of one among on sixty characters to arrange, a skilled person in the art can easily provide the logic of drive in order to increase the number of characters to choose. For example, it is possible to consider two different situations of the selection key:

key subject to a pressure towards the sensor, and temporary stop of the selection key, for at least a predetermined time, at the sensor.

These two situations could be used to allow, for example, to shift from the digitation of a lower case character to the digitation of the same character in upper case and respectively to allow the acquisition of the selected character. In this way the number is doubled of characters or symbols that the device according to the invention is capable to generate.

And further, a pressure of the selection key in the central position, on activation member 10, could cause a commutation of the logic of drive among different programs, to associate then to the different sensors thus achieved functions different from those related to simple transmission of characters, as usual in keyboards of cellular telephones.

For example, in the central position O a position sensor could be provided that is lower with respect to all the other (not shown in the figures) so that the resilient means bring back to the centre the activation member and allow the latter to reach the lower sensor and to push the same thus generating a signal that can affect all the keyboard. By changing the program the type of writing is changed, as well as the symbols, which can pass from lower case to upper case, etc.

The compactness of the solution according to the invention is immediately clear taking into account the reduced size that can be obtained.

FIG. 2 shows, very diagrammatically, a first way of operation of the present invention, with the matrix structure formed in a plane 11, actually made up of two coupled plates 11' and 11", of which the upper plate 11' defines a contour that defines zones A, B, C and D and the lower plate 11" has the sensors associated to each zone. With this plane structure can be used, as selection key, in addition to the slider shown in figures from 8 to 11, also a driving stick (of the type already known in electronic devices like "palm top"), whose tip is caused to slide in the plane of the sensors, guided in part by the support on the protruding contour defining the zones of the matrix.

In this purely exemplary embodiment the user can work simply causing first the stick to rest at the centre, on the activation member 10, only with the object of activating the matrix, and then causing the tip of the stick to slide on the surface that has the sensors, towards one of the radial zones, causing then it to pass firstly on one of the sensors 1, 2, 3 of the first group of sensors and then bringing it in contact with one of the sensors 4, 5, 6, 7 and 8 of the second group.

Alternatively, it is possible to use at the centre, i.e. with a slider movable in the plane of the sensors 1 to 8, but that cannot escape out from this plane, for example held by a system having a spring or a resilient membrane capable of following movements on said plane, without raising from the same.

Figure 3:
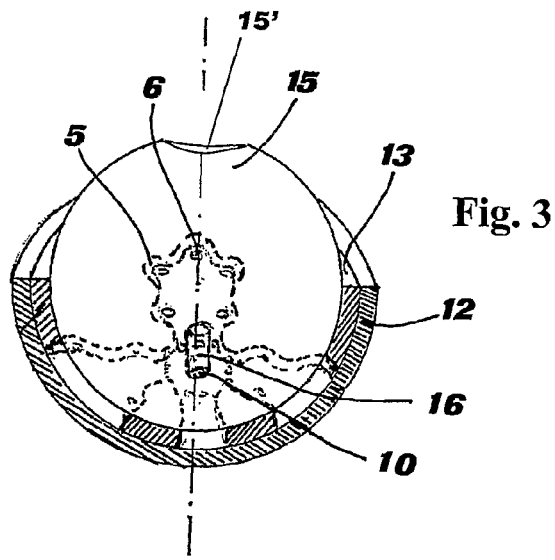
FIG. 3 is a diagrammatical three-dimensional view, partially cross sectioned, of a second exemplary embodiment of the device according to the invention, with spherical configuration.
Figure 4:
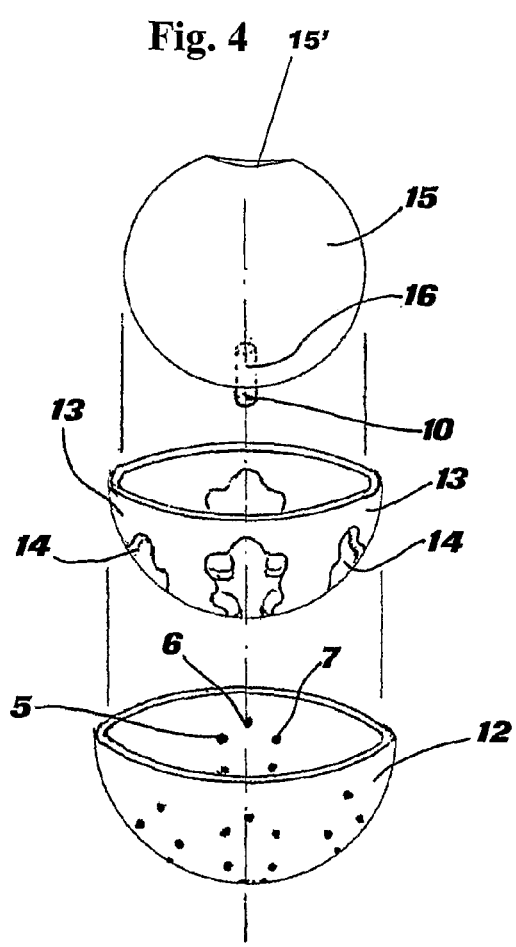
FIG. 4 is an exploded view of the same device of FIG. 3, where the component parts are shown.
Figure 12:
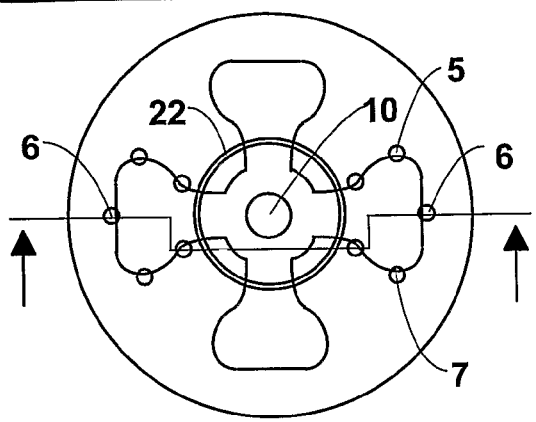
FIGS. 12 and 13 show respectively a top plan view and a cross sectional view of a possible structure of the second exemplary embodiment of the device according to the invention.
Figure 13:
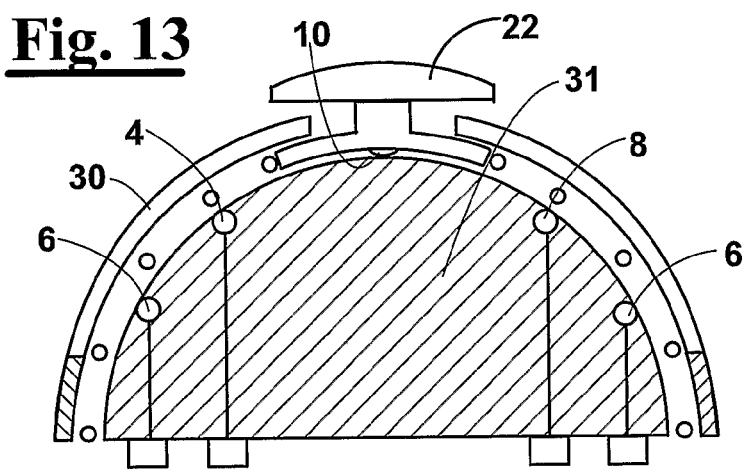
Figure 14:
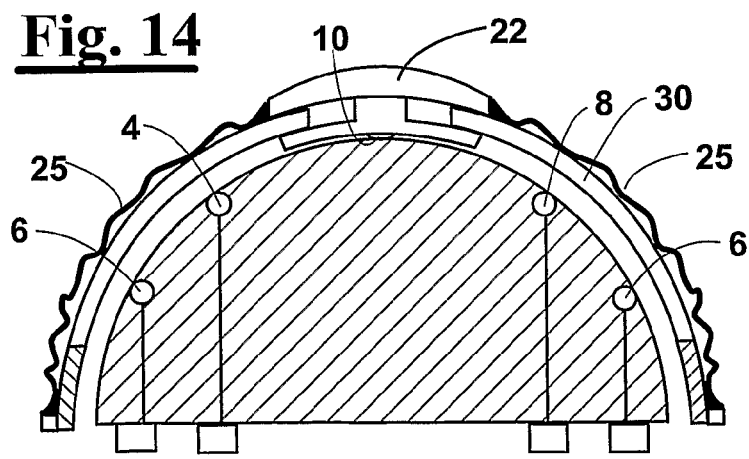
FIG. 14 shows an exemplary structure of the solution of FIG. 13 with a resilient membrane, instead of a spring, for controlling the position of the selection key.

FIGS. 3 and 4, as well as FIGS. 12-14, show instead, always very diagrammatically, a second exemplary embodiment of the present invention, with the matrix structure formed on of a spherical cap. Parallel to what described with reference to FIG. 2, the spherical cap comprises a first surface 12, on which the sensors from 1 to 8 are located, and a second surface 13, on which windows 14 are made for delimitation to the areas O, A, B, C and D. Within the recess consisting of the two caps coupled, as shown in particular in FIG. 3, a ball of control 15 is inserted, having a guiding appendage 16; this appendage, which is capable of moving within the window 14 for being from these guided towards the sensors from 1 to 8, has at its end the active element, i.e. activation member 10, capable of activating the different other sensors, relevant to each zone, as previously shown, located on the surface 12.

More precisely, the guiding appendage 16 can be magnetic, arranged with its own axis coincident with the pole axis of the ball and protruding from the spherical surface of a measure which is the same as the thickness of the spherical cap 13 containing the track of control consisting of windows 14. This way, a base surface 10 of said appendage 16 is tangential to the inner surface of spherical cap 12, on which the sensors 1 to 8 are located, adapted to be activated according to the logic shown, to calculate the passage and the position of the selection key associated to appendage 16.

The term "spherical cap", notwithstanding the representation of figures from 3 to 5 relates actually to a ball, has to be construed in a purely exemplifying way: it is in fact straightforward for a skilled person to think to the use of an another desired surface having finite curvature, having a centre or an axis of rotation. In case of the embodiment concerning cap 15, or another desired form, a recess 15' can be provided, or a protrusion or a ridged or knurled surface, to assist the grip by the user.

As it is immediately understandable, the drawing of FIG. 1 can be representative, approximately, also to the projection of a spherical portion 12, 13, seen from the upper pole, in a plane tangential to the lower ball pole. The active element or activation member 10 associated to guiding appendage 16 has then a function equivalent to that of element 10 of FIG. 1, put in the tip of the stick used in the exemplary embodiment of FIG. 2.

The ball 15 is operated for example causing it to rotate by friction with the tip of a finger that rests on its upper part: when the ball is thus caused to rotate, the cylindrical appendage 16 equipped with the activation member 10, is moved in turn, sliding firstly on the sensors 1, 2, 3 of the first group and then on the sensors 4 to 8 of the second group, all associated to the ball 12; the motion of activation member 10 near one of the sensors 1 to 8 provides an electric signal in the way already described with reference to FIG. 1. On the ball can be represented, for example, the shape of a cloverleaf with the sensors of the first and second group and its relative function.

Figure 5:
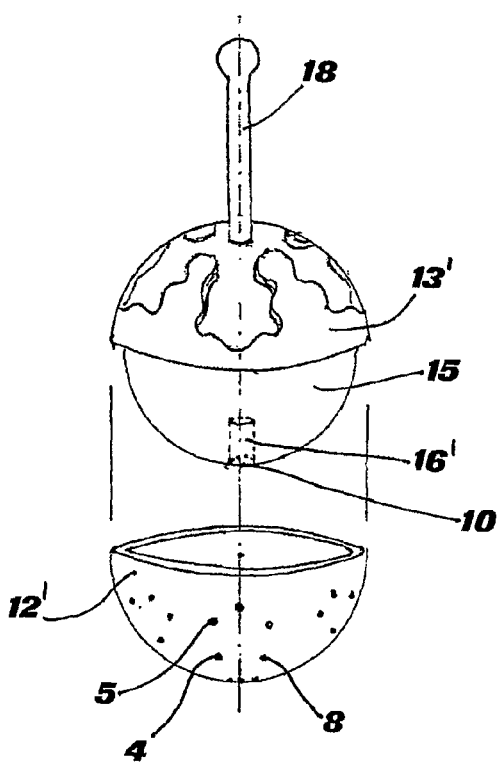
FIG. 5 is a three-dimensional view, partially exploded, of an exemplary embodiment similar to FIG. 3, but with a outer and operating guiding system by means of a lever or "joystick"

The mode of operation remain the same shown in case of the configuration of FIG. 5, where the difference is only the operation made by a lever of manoeuvre 18, integral to the ball 15. In this case, the ball 15 is however contained within two opposite spherical caps, and the window 14 forming the radial zones of the cloverleaf carry out a guiding function of lever 18. A guiding appendage 16, is not any more provided, replaced by a sensor 16' (for example a magnet) incorporated in the ball 15 in a position diametrically opposite to lever 18.

The advantages of the invention with respect to the state of the art are clear, particularly versus costs and especially with possibility of miniaturization of the devices, being the discrimination due to solid state devices than to mechanical apparatus, operating in a way well known in the art, which here for simplicity are not described.

In the description reference has not been made to techniques for assembling the device in its different shapes, since they consist of known techniques and do not relate to the novel features of the invention.

In the description reference has been made to sensors based on magnetic field variation, but the sensors can use other desired techniques, such as the capacity variation, optical techniques, phototransistor arrays, or the properties of conductivity of microtransistors on a polymeric substrate exploiting recent developments of nanotechnologies, of microelectronics or other techniques obvious to the skilled person.

Always in the description reference has been made to a display of a telephone, palmtop etc., but it can be also any auxiliary display to assist the selection of symbols. In a zone of the display the most frequently used symbols can be highlighted when they are activated by the slider.

The foregoing description of a specific embodiment will so fully reveal the invention according to the conceptual point of view, so that others, applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A device for selection of symbols, selected from characters or icons, comprising:
   a matrix carrying a plurality of sensors split into a first group of sensors having function of choice and at least a second group of sensors associated each to a limited number of said symbols;
   an activation member of said sensors, adapted to slide relative to said sensors in order to be brought at least partially in coincidence with one of said sensors thus producing a corresponding selection signal;
   a selection key which can be operated manually for bringing in turn said activation member to select a first sensor belonging to said first group and then a second sensor belonging to said second group, said sensors being distributed on said matrix according to modular zones, comprising a central zone and radial sector zones angularly equidistant or non-equidistant, the sensors of the first group being located in a passageway between said central zone and each of said radial sector zones, and the sensors of the second group being located within said radial sector zones; and
   means for guiding, at least partially, said selection key for determining the relative movement of said activation member with respect to said sensors, said means for guiding comprising edges in relief of said radial sector zones, said sensors of said second group being on said edges in relief,
   wherein the device is configured to be operated without looking at the motion the selection key follows operated by action of a finger.

2. The device according to claim 1, wherein said activation member is located at rest in a central position, said sensors of the first group are located in a position around said central position, and said sensors of the second group are located in a position external to the sensors of the first group with respect to said central position, whereby for reaching a sensor of the second group said key must pass on a sensor of the first group, activating the device.

3. The device according to claim 1, wherein said activation member is integral to said selection key and said matrix of sensors is in fixed position.

4. The device according to claim 1, wherein said activation member is integral to said matrix of sensors and said selection key is in fixed position.

5. The device according to claim 1, wherein said matrix of sensors is formed on a surface that is a plane surface or a curved surface.

6. The device according to claim 1, wherein said sensors of said second group are arranged according to recesses defined by said edges in relief or other modular shapes that assist their selection.

7. The device according to claim 1, wherein said activation member is a magnet and said sensors are proximity sensors.

8. The device according to claim 1, comprising three overlapped elements with a plane, spherical, or curved shape, of which a first element provides said matrix of sensors, a second element provides said selection key and said activation member and slides with respect to said first element, and a third element comprises guiding paths for said selection key and is integral to said first element.

9. The device according to claim 1, further comprising:
a control unit adapted to identify each sensor of said first and second group selected by said activation member, and, for each selected sensor of the second group, to choose univocally one among the limited number of symbols associated to said sensor of the second group responsive to which sensor of the first group had been selected immediately before by said activation member.

10. A method for selection of symbols selected from characters or icons, comprising the steps of:
prearranging a matrix carrying a plurality of sensors split into a first group of sensors having function of choice and at least a second group of sensors associated each to a limited number of said symbols;
activating said sensors, bringing an activation member at least partially in coincidence with one of said sensors thus producing a corresponding selection signal, wherein said activation member is brought in turn on a first sensor belonging to said first group and then a second sensor belonging to said second group; wherein the activation member is adapted to slide relative to said sensors in order to be brought at least partially in coincidence with one of said sensors, thus producing a corresponding selection signal, by motion of a selection key which can be operated manually for bringing in turn said activation member to select a first sensor belonging to said first group and then a second sensor belonging to said second group, said sensors being distributed on said matrix according to modular zones, comprising a central zone and radial sector zones angularly equidistant, the sensors of the first group being located in a passageway between said central zone and each of said radial sector zones, and the sensors of the second group being located within said radial sector zones;
identifying each sensor of said first and second group selected by said activation member, and, for each selected sensor of the second group, choosing univocally one among the limited number of symbols associated to said sensor of the second group responsive to which sensor of the first group had been selected immediately before by said activation member, and
providing a means for guiding, at least partially, said selection key for determining the relative movement of said activation member with respect to said sensors, said guiding means consisting of edges in relief of said radial sector zones, said sensors of said second group being on said edges in relief;
wherein the method functions without looking at the motion the selection key follows operated by action of a finger.

11. The method for selection of symbols according to claim 10, wherein the method is carried out with a device comprising:
a matrix carrying a plurality of sensors split into a first group of sensors having function of choice and at least a second group of sensors associated each to a limited number of said symbols;
a control unit adapted to identify each sensor of said first and second group selected by said activation member, and, for each selected sensor of the second group, to choose univocally one among the limited number of symbols associated to said sensor of the second group responsive to which sensor of the first group had been selected immediately before by said activation member.

12. A selection device, comprising:
a matrix carrying a plurality of sensors split into a first group of sensors having function of choice and at least a second group of sensors associated each to a limited number of said symbols;
an activation member of said sensors, adapted to slide relative to said sensors in order to be brought at least partially in coincidence with one of said sensors thus producing a corresponding selection signal;
a selection key which can be operated manually for bringing in turn said activation member to select a first sensor belonging to said first group and then a second sensor belonging to said second group, said sensors being distributed on said matrix according to modular zones, comprising a central zone and radial sector zones angularly equidistant or non-equidistant, the sensors of the first group being located in a passageway between said central zone and each of said radial sector zones, and the sensors of the second group being located within said radial sector zones; and
a guide for said selection key for determining the relative movement of said activation member with respect to said sensors, said guide comprising edges in relief of said radial sector zones, said sensors of said second group being on said edges in relief,
wherein the device is configured to be operated without looking at the motion the selection key follows operated by action of a finger.

13. The device according to claim 12, further comprising:
a control unit adapted to identify each sensor of said first and second group selected by said activation member, and, for each selected sensor of the second group, to choose univocally one among the limited number of symbols associated to said sensor of the second group responsive to which sensor of the first group had been selected immediately before by said activation member.

14. The device according to claim 12, wherein said activation member is located at rest in a central position, said sensors of the first group are located in a position around said central position, and said sensors of the second group are located in a position external to the sensors of the first group with respect to said central position, whereby for reaching a sensor of the second group said key must pass on a sensor of the first group, activating the device.

15. The device according to claim 12, wherein said activation member is integral to said selection key and said matrix of sensors is in fixed position.

16. The device according to claim 12, wherein said activation member is integral to said matrix of sensors and said selection key is in fixed position.

17. The device according to claim 12, wherein said matrix of sensors is formed on a surface that is a plane surface or a curved surface.

18. The device according to claim 12, wherein said sensors of said second group are arranged according to recesses defined by said edges in relief or other modular shapes that assist their selection.

19. The device according to claim 12, wherein said activation member is a magnet and said sensors are proximity sensors.

20. The device according to claim 12, comprising three overlapped elements with a plane, spherical, or curved shape, of which a first element provides said matrix of sensors, a second element provides said selection key and said activation member and slides with respect to said first element, and a third element comprises guiding paths for said selection key and is integral to said first element.

* * * * *